United States Patent
Inoue et al.

(10) Patent No.: US 11,808,577 B2
(45) Date of Patent: Nov. 7, 2023

(54) ATOMIC GYROSCOPE AND ATOMIC INTERFEROMETER

(71) Applicants: JAPAN AVIATION ELECTRONICS INDUSTRY, LIMITED, Tokyo (JP); TOKYO INSTITUTE OF TECHNOLOGY, Tokyo (JP)

(72) Inventors: Ryotaro Inoue, Tokyo (JP); Mikio Kozuma, Kanagawa (JP); Atsushi Tanaka, Tokyo (JP)

(73) Assignees: JAPAN AVIATION ELECTRONICS INDUSTRY, LIMITED, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 0 days.

(21) Appl. No.: 17/780,668

(22) PCT Filed: Sep. 24, 2020

(86) PCT No.: PCT/JP2020/035894
§ 371 (c)(1),
(2) Date: May 27, 2022

(87) PCT Pub. No.: WO2021/131189
PCT Pub. Date: Jul. 1, 2021

(65) Prior Publication Data
US 2023/0011067 A1     Jan. 12, 2023

(30) Foreign Application Priority Data

Dec. 25, 2019   (JP) ................ 2019-234570

(51) Int. Cl.
*G01C 19/72* (2006.01)
*G01P 3/36* (2006.01)
(Continued)

(52) U.S. Cl.
CPC .......... *G01C 19/721* (2013.01); *G01C 19/58* (2013.01); *G01P 3/36* (2013.01); *G01P 15/14* (2013.01);
(Continued)

(58) Field of Classification Search
CPC ........ G01C 19/58; G01C 19/60; G01C 19/62; G01C 19/721; G01P 3/36; G01P 15/14;
(Continued)

(56) References Cited

U.S. PATENT DOCUMENTS 5,315,109 A  *  5/1994  Thomas ............... H05H 3/04
                                                                250/251
10,444,016 B1 * 10/2019 Kasevich ............ G01C 19/58
(Continued)

FOREIGN PATENT DOCUMENTS

| CN | 102538775 | | 7/2012 | |
| KR | 20180025035 A | * | 3/2018 | ........... G01C 19/065 |
| WO | WO2019/073655 A1 | | 4/2019 | |

OTHER PUBLICATIONS

Liu, Y. et al. "Progress on atomic gyroscope". 2017 24th Saint Petersburg International Conference on Integrated Navigation Systems (ICINS), St. Petersburg, Russia, 2017, pp. 1-7. (Year: 2017).*
Gustavson et al., "Precision Rotation Measurements with an Atom Interferometer Gyroscope", Physical Review Letters vol. 78, No. 11, Mar. 17, 1997, pp. 2046-2049.
(Continued)

*Primary Examiner* — Michael A Lyons
(74) *Attorney, Agent, or Firm* — Greenblum & Bernstein, P.L.C.

(57) ABSTRACT

An atomic interferometer includes: an optical system including an optical modulating device that includes: an optical fiber for a first laser beam to propagate therein; and a frequency shifter connected to the optical fiber and configured to shift the frequency of the first laser beam, the optical system being configured to generate a moving standing light wave from counter-propagation of the first laser beam from
(Continued)

the optical modulating device and a second laser beam; and an interference system for making an atomic beam interact with three or more moving standing light waves including the moving standing light wave.

6 Claims, 6 Drawing Sheets

(51) Int. Cl.
    *G01P 15/14*     (2013.01)
    *G02F 2/02*     (2006.01)
    *G01C 19/58*     (2006.01)
    *G02F 1/11*     (2006.01)
    *G02F 1/09*     (2006.01)

(52) U.S. Cl.
    CPC ............... *G02F 1/11* (2013.01); *G02F 2/02* (2013.01); *G02F 1/093* (2013.01); *G02F 2201/02* (2013.01)

(58) Field of Classification Search
    CPC ... G02F 1/093; G02F 1/11; G02F 2/02; G02F 2201/02
    See application file for complete search history.

(56) References Cited

U.S. PATENT DOCUMENTS

| | | | |
|---|---|---|---|
| 10,801,840 B1* | 10/2020 | Solmeyer | G01C 19/58 |
| 2016/0298967 A1* | 10/2016 | Johnson | G01C 19/58 |
| 2017/0016710 A1* | 1/2017 | Black | G01C 19/58 |
| 2017/0370840 A1 | 12/2017 | Sinclair et al. | |
| 2020/0333139 A1 | 10/2020 | Kozuma et al. | |

OTHER PUBLICATIONS

Gustavson, "Precision Rotation Sensing Using Atom Interferometry", Ph.D. dissertation, Stanford University, Feb. 2000, pp. i-xiv, 1-167.
International Search Report issued in International Patent Application No. PCT/JP2020/035894, dated Dec. 8, 2020, along with an English translation thereof.
Xue et al., "A Cold Atomic Beam Interferometer," Journal of Applied Physics, Published Feb. 2014.
Office Action issued in Corresponding AU Patent Application No. 2020415534, dated Apr. 6, 2023.
T. Muller et al., A compact dual atom interferometer gyroscope based on laser-cooled rubidium, Jun. 5, 2008, 9 pages.
A. Peters et al., High-precision gravity measurements using atom interferometry, 2001, Metrologia, pg. 25-61.
T.L., Gustavson et al., Precision Rotation Measurements with an Atom Interferometer Gyroscope, Mar. 17, 1997, Physical Review Letters, vol. 78 N. 11, p. 2046-2049.
Lin Zhou et al., Measurement of Local Gravity via a Cold Atom Interferometer, 2011, Chin. Phys. Lett., vol. 28 No. 1, p. 013701-1 to 013701-4.
S Riedl et al., Compact atom-interferometer gyroscope based on an expanding ball of atoms, 2015, Journal of Physics: Conference Series 723, 6 pages.
Extended European Search Report issued in Corresponding EP Patent Application No. 20906053.2, dated Jun. 1, 2023.
Nan Li et al., The Raman Laser system for Mach-Zehnder Atom Interferometry, Apr. 4, 2016, IEEE, p. 1-3.
Holger Muller et al., Atom Interferometry with up to 24-Photon-Momentum-Transfer Beam Splitters, Dec. 12, 2007 and revised May 11, 2008, APS, p. 1-4.
Office Action issued in Australia Counterpart Patent Appl. No. 2020415534, dated Sep. 5, 2023.

\* cited by examiner

ATOMIC GYROSCOPE AND ATOMIC INTERFEROMETER

TECHNICAL FIELD

The present invention relates to a compact atomic gyroscope and a compact atomic interferometer and more particularly relates to a compact optical system for an atomic interference system.

BACKGROUND ART

With the development of laser technology, advances have been recently made in studies of an atomic interferometer, a gravitational accelerometer using atomic interference, an atomic gyroscope, and so forth. Known examples of the atomic interferometer include a Mach-Zehnder atomic interferometer as presented in Xue et al., "A Cold Atomic Beam Interferometer," Journal of Applied Physics, published February 2014 (hereinafter referred to as "Non-patent Literature 3"), a Ramsey-Borde atomic interferometer, and so forth. A prior-art Mach-Zehnder atomic interferometer 900, as generally presented in Non-patent Literature 3 and shown in FIG. 1 includes an atomic beam source 100, an interference system 200, an optical system 300, and an observation unit 400. The atomic beam source 100, the interference system 200, and the observation unit 400 are housed in an unillustrated vacuum chamber.

The atomic beam source 100 generates an atomic beam 100a. Examples of the atomic beam 100a include a thermal atomic beam, a cold atomic beam which is an atomic beam with a speed lower than the speed of the thermal atomic beam, Bose-Einstein condensate, or the like. The thermal atomic beam is generated, for example, by heating a high-purity element in an oven. The cold atomic beam is generated, for example, by laser-cooling a thermal atomic beam. The Bose-Einstein condensate is generated by cooling Bose particles to near absolute zero temperature. Individual atoms included in the atomic beam 100a are set at the same energy level—for example, |g>, which will be described later—by optical pumping.

In the interference system 200, the atomic beam 100a passes through three moving standing light waves 200a, 200b, and 200c. Note that the moving standing light waves are generated by counter-propagating laser beams with different frequencies, and drift at a speed sufficiently lower than the speed of light. It is to be noted that a difference between the wave number of one laser beam and the wave number of the other laser beam is sufficiently small.

The following is a brief outline of an example optical configuration of the optical system 300 that generates the moving standing light waves.

A master laser beam ML from a master laser source 301 is divided into two branches, for example, by a beam splitter BS1 and a mirror M1. One of the bifurcated master laser beam ML is input to a first slave laser source 303. A first slave laser beam SL1 synchronized with the master laser beam ML passes through a ½ wave plate HWP1, which results in generation of a laser beam $L_1$. The laser beam $L_1$ enters a polarizing beam splitter PBS1 via a mirror M2. The other of the bifurcated master laser beam ML is frequency-shifted by a predetermined frequency f that is nearly equal to a resonance frequency, which will be described later, by passing through an electro-optic modulator (EOM) 302, for example. The frequency-shifted master laser beam ML is input to a second slave laser source 304. A second slave laser beam SL2 synchronized with the frequency-shifted master laser beam ML passes through a ½ wave plate HWP2, which results in generation of a laser beam $L_2$. It is to be noted that the polarization direction of the laser beam $L_1$ and the polarization direction of the laser beam $L_2$ intersect at right angles. The laser beam $L_2$ enters the polarizing beam splitter PBS1.

The laser beam $L_1$ and the laser beam $L_2$ are superposed each other by the polarizing beam splitter PBS1 and guided to an area near the atomic beam 100a by a single-mode polarization-maintaining fiber PMF.

With regard to the three moving standing light waves 200a, 200b, and 200c, the first moving standing light wave 200a and the third moving standing light wave 200c each have a property called a π/2 pulse, which will be described later, and the second moving standing light wave 200b has a property called a π pulse, which will be described later. To achieve such a difference in property, first, the laser beam coming out of the polarization-maintaining fiber PMF, that is, the superposed laser beam $L_1$ and laser beam $L_2$ are subjected to shaping so as to be a desired Gaussian beam by a beam shaper 305 built up of, for example, a lens, a collimator, an optical amplifier, and so forth. Then, the obtained Gaussian beam is divided into three pairs of laser beams, that is, a pair of a laser beam $L_{1,a}$ and a laser beam $L_{2,a}$, a pair of a laser beam $L_{1,b}$ and a laser beam $L_{2,b}$, and a pair of a laser beam $L_{1,c}$ and a laser beam $L_{2,c}$ by a beam divider 306 built up of, for example, a ½ wave plate, a beam splitter, and so forth.

The laser beam $L_{1,x}$ and the laser beam $L_{2,x}$ ($x \in \{a, b, c\}$) pass through a ¼ wave plate QWP1$x$ and become right-handed circularly polarized light $\sigma_{1,x}^{+,i}$ and left-handed circularly polarized light $\sigma_{2,x}^{-,i}$, respectively. The right-handed circularly polarized light $\sigma_{1,x}^{+,i}$ and the left-handed circularly polarized light $\sigma_{2,x}^{-,i}$ then pass through a ¼ wave plate QWP2$x$ and enter a polarizing beam splitter PBS2$x$. The path of the linearly polarized light corresponding to the right-handed circularly polarized light $\sigma_{1,x}^{+,i}$ is changed by the polarizing beam splitter PBS2$x$. The linearly polarized light corresponding to the left-handed circularly polarized light $\sigma_{2,x}^{-,i}$ passes through the polarizing beam splitter PBS2$x$, is reflected from a retroreflector RR$x$, passes through the polarizing beam splitter PBS2$x$ again, passes through the ¼ wave plate QWP2$x$ again, and becomes right-handed circularly polarized light $\sigma_{2,x}^{+,r}$. As a result, the right-handed circularly polarized light $\sigma_{1,x}^{+,i}$, which is derived from the laser beam that is from the polarization-maintaining fiber PMF, and the right-handed circularly polarized light $\sigma_{2,x}^{+,r}$, which is derived from the laser beam that is from the retroreflector RR$x$, counter-propagate in free space to generate a moving standing light wave 200$x$ ($x \in \{a, b, c\}$).

The atomic interferometer uses transition between two levels of an atom caused by light irradiation. Thus, from the viewpoint of avoiding decoherence due to spontaneous emission, long-lived transition between two levels is generally used. For example, when an atomic beam is an alkali-metal atomic beam, the atomic interferometer uses induced Raman transition between two levels included in a hyperfine structure in a ground state. Let |g> be the lowest energy level and |e> be an energy level higher than |g>, in the hyperfine structure. In general, induced Raman transition between two levels is achieved by a moving standing light wave which is formed by counter irradiation of two laser beams, whose difference frequency is nearly equal to the resonance frequency of |g> and |e>.

Hereinafter, provided is a description of atomic interference using the two-photon Raman process caused by the moving standing light waves.

In the course of the atomic beam 100a from the atomic beam source 100 passing through the first moving standing light wave 200a, the state of every atom changes from the initial state |g, p> to the superposition state of |g, p> and |e, p+h($k_1-k_2$)>. Note that p is momentum of an atom, h is a Dirac constant, that is, a value obtained by dividing a Planck's constant by $2\pi$, $k_1$ is a wave number of one of two laser beams which form a moving standing light wave, and $k_2$ is a wave number of the other laser beam. For example, by appropriately setting a time $\Delta t$ required to pass through the first moving standing light wave 200a (that is, a time of interaction between an atom and the moving standing light wave), the ratio between the existence probability of |g, p> and the existence probability of |e, p+h($k_1-k_2$)> immediately after the passage through the first moving standing light wave 200a is 1:1. While transiting from |g, p> to |e, p+h($k_1-k_2$)> through absorption and emission of two photons traveling against each other, an atom acquires momentum of two photons. Thus, the moving direction of atoms in the state |e, p+h($k_1-k_2$)> deviates from the moving direction of atoms in the state |g, p>. In other words, in the course of the atomic beam 100a passing through the first moving standing light wave 200a, the atomic beam 100a splits into, at a ratio of 1:1, an atomic beam composed of atoms in the state |g, p> and an atomic beam composed of atoms in the state |e, p+h($k_1-k_2$)>. The first moving standing light wave 200a is called a $\pi/2$ pulse and has a function as an atomic beam splitter.

After the split, the atomic beam composed of atoms in the state |g, p> and the atomic beam composed of atoms in the state |e, p+h($k_1-k_2$)> pass through the second moving standing light wave 200b. For example, by setting a time required to pass through the second moving standing light wave 200b at $2\Delta t$, in other words, by setting a time of interaction between an atom and the moving standing light wave at $2\Delta t$, the atomic beam composed of atoms in the state |g, p> is reversed to an atomic beam composed of atoms in the state |e, p+h($k_1-k_2$)> in the course of passing through the second moving standing light wave 200b, and the atomic beam composed of atoms in the state |e, p+h($k_1-k_2$)> is reversed to an atomic beam composed of atoms in the state |g, p> in the course of passing through the second moving standing light wave 200b. At this time, as for the former, the moving direction of the atoms that have transited from |g, p> to |e, p+h($k_1-k_2$)> deviates from the moving direction of the atoms in the state |g, p>, as described earlier. As a result, the traveling direction of the atomic beam composed of atoms in the state |e, p+h($k_1-k_2$)> after the passage through the second moving standing light wave 200b becomes parallel to the traveling direction of the atomic beam composed of atoms in the state |e, p+h($k_1-k_2$)> after the passage through the first moving standing light wave 200a. Moreover, as for the latter, in transition from |e, p+h($k_1-k_2$)> to |g, p> through absorption and emission of two photons traveling against each other, an atom loses the same momentum as that gained from two photons. That is, the moving direction of atoms after transition from |e, p+h($k_1-k_2$)> to |g, p> deviates from the moving direction of atoms in the state |e, p+h($k_1-k_2$)> before the transition. As a result, the traveling direction of the atomic beam composed of atoms in the state |g, p> after the passage through the second moving standing light wave 200b becomes parallel to the traveling direction of the atomic beam composed of atoms in the state |g, p> after the passage through the first moving standing light wave 200a. The second moving standing light wave 200b is called a $\pi$ pulse and has a function as an atomic beam mirror.

After the reversal, the atomic beam composed of atoms in the state |g, p> and the atomic beam composed of atoms in the state |e, p+h($k_1-k_2$)> pass through the third moving standing light wave 200c. Assume that the atomic beam 100a from the atomic beam source 100 passes through the first moving standing light wave 200a at time $t_1=T$ and two atomic beams after the split pass through the second moving standing light wave 200b at time $t_2=T+\Delta T$. Then, two atomic beams after the reversal pass through the third moving standing light wave 200c at time $t_3=T+2\Delta T$. At the time $t_3$, the atomic beam composed of atoms in the state |g, p> after the reversal and the atomic beam composed of atoms in the state |e, p+h($k_1-k_2$)> after the reversal cross each other. For example, by appropriately setting a time required to pass through the third moving standing light wave 200c, that is, a time of interaction between an atom and the moving standing light wave, specifically, by setting a time required to pass through the third moving standing light wave 200c at $\Delta t$ mentioned above, it is possible to obtain an atomic beam 100b corresponding to a superposition state of |g, p> and |e, p+h($k_1-k_2$)> of individual atoms included in a region of intersection between the atomic beam composed of atoms in the state |g, p> and the atomic beam composed of atoms in the state |e, p+h($k_1-k_2$)>. This atomic beam 100b is an output of the interference system 200. The third moving standing light wave 200c is called a $\pi/2$ pulse and has a function as an atomic beam combiner.

While an angular velocity or an acceleration in a plane including two paths of the atomic beams from the action of the first moving standing light wave 200a to the action of the third moving standing light wave 200c is applied to the Mach-Zehnder atomic interferometer 900, a phase difference is produced in the two paths of the atomic beams from the action of the first moving standing light wave 200a to the action of the third moving standing light wave 200c, and this phase difference is reflected in the existence probabilities of the state |g> and the state |e> of the individual atoms after the passage through the third moving standing light wave 200c. Thus, the monitor 400 detects the angular velocity or the acceleration by monitoring the atomic beam 100b from the interference system 200, that is, the atomic beam obtained after the passage through the third moving standing light wave 200c. More specifically, the monitor 400 detects the angular velocity or the acceleration by measuring the population of atoms in an excited state |e>. For example, the monitor 400 irradiates the atomic beam 100b from the interference system 200 with a probe beam 408 and detects fluorescence from the atoms in the state |e, p+h($k_1-k_2$)> using a photodetector 409. Examples of the photodetector 409 include a photomultiplier tube and a fluorescent photodetector. Alternatively, in the case of using a channeltron as the photodetector 409, the atomic beam of one of the two paths after the passage through the third moving standing light wave 200c may be ionized by laser beam or the like in place of a probe beam and ions may be detected using the channeltron.

A configuration is also known in which, in the optical system 300 described above, acousto-optic modulators (AOM) 307x (x∈{a, b, c}) are added to a retroreflection optical configuration that converts the left-handed circularly polarized light $\sigma_{2,x}^{-,i}$ to the right-handed circularly polarized light $\sigma_{2,x}^{+,r}$ (see FIG. 2; FIG. 2 shows a configuration obtained by applying the configuration of FIG. 5.18 of Non-patent Literature 2 to the configuration of FIG. 1). The retroreflection optical configuration to which the AOMs 307$x$ ($x \in \{a, b, c\}$) are added has an advantage in that it is possible to cancel the influence of vibration of the retroreflector RRx because this configuration can adjust, using the AOM 307$x$ ($x \in \{a, b, c\}$), the phase of at least one of two laser beams which form the moving standing light wave 200$x$ ($x \in \{a, b, c\}$).

As for a Mach-Zehnder atomic interferometer using the two-photon Raman process using the moving standing light waves described above, Non-patent Literature 1, Non-patent Literature 2, and so forth, for example, are helpful.

PRIOR ART LITERATURE

Non-Patent Literature

Non-patent Literature 1: T. L. Gustayson, P. Bouyer and M. A. Kasevich, "Precision Rotation Measurements with an Atom Interferometer Gyroscope," Phys. Rev. Lett. 78, 2046-2049, Published 17 Mar. 1997.
Non-patent Literature 2: T. L. Gustayson, "Precision rotation sensing using atom interferometry," Ph.D. dissertation, Stanford University, 2000.
Non-patent Literature 3: Xue et al., "A Cold Atomic Beam Interferometer," Journal of Applied Physics, Published February 2014.

SUMMARY OF THE INVENTION

Problems to be Solved by the Invention

The retroreflection optical configuration to which the AOMs 307$x$ ($x \in \{a, b, c\}$) are added includes, in addition to the AOMs 307$x$ ($x \in \{a, b, c\}$), lenses LS1$x$ ($x \in \{a, b, c\}$) each for making the propagation mode of the laser beam $L_2$, which is suitable for interaction between the atomic beam 100$a$ and the moving standing light wave 200$x$, match up with the propagation mode, which is suitable for interaction between the AOM 307$x$ and the laser beam $L_2$; and lenses LS2$x$ ($x \in \{a, b, c\}$) each for making the propagation mode of the laser beam $L_2$ incident on the retroreflector RRx match up with the propagation mode of the laser beam $L_2$ reflected from the retroreflector RRx. In general, the distance between the lens LS1$x$ and the AOM 307$x$ coincides with the focal distance of the lens LS1$x$, the distance between the lens LS2$x$ and the AOM 307$x$ coincides with the focal distance of the lens LS2$x$, and the distance between the lens LS2$x$ and the retroreflector RRx coincides with the focal distance of the lens LS2$x$.

Since the actual diffraction efficiency of the AOM 307$x$ does not reach 1, zeroth-order light, that is, a non-diffracting laser beam having the same frequency component as that of the incident laser beam comes out of the AOM 307$x$. An unnecessary light standing wave that varies irregularly is generated when the non-diffracting laser beam returns to the interference system 200; therefore, there is a need to eliminate the non-diffracting laser beam. Specifically, diffracted light of an order n which is necessary for generating a moving standing light wave is separated from diffracted light of any order other than the order n in a space between the AOM 307$x$ and the retroreflector RRx. That is, the distance between the AOM 307$x$ and the retroreflector RRx is set at a length equal to or greater than a distance that is calculated from the beam diameter of the laser beam $L_2$ and an angular difference between the diffraction angle of diffracted light of an order n and the diffraction angle of diffracted light of an order n+1 or n−1. Consequently, the total length of the retroreflection optical configuration generally tends to be large. The retroreflection optical configuration that is large in length is one of impediments to practical utilization of an atomic gyroscope.

Therefore, an object of the present invention is to provide a compact atomic gyroscope and a compact atomic interferometer.

Means to Solve the Problems

The below-mentioned technical matter is described simply for facilitating the understanding of the main points of the present invention, not for explicitly or implicitly limiting the invention recited in the claims and not for making a statement about the possibility of accepting such a limitation imposed by a person other than a beneficiary, for example, an applicant and a right holder, of the present invention.

In an optical system for an atomic interference system, the present invention adopts an optical configuration including an AOM and guiding a laser beam by an optical fiber in place of a retroreflection optical configuration to which an AOM is added.

Effects of the Invention

The present invention can implement a compact atomic gyroscope and a compact atomic interferometer because it adopts an optical configuration that guides a laser beam by an optical fiber, not a retroreflection optical configuration that tends to have a large and long size.

DETAILED DESCRIPTION OF THE EMBODIMENTS

Figure 1:
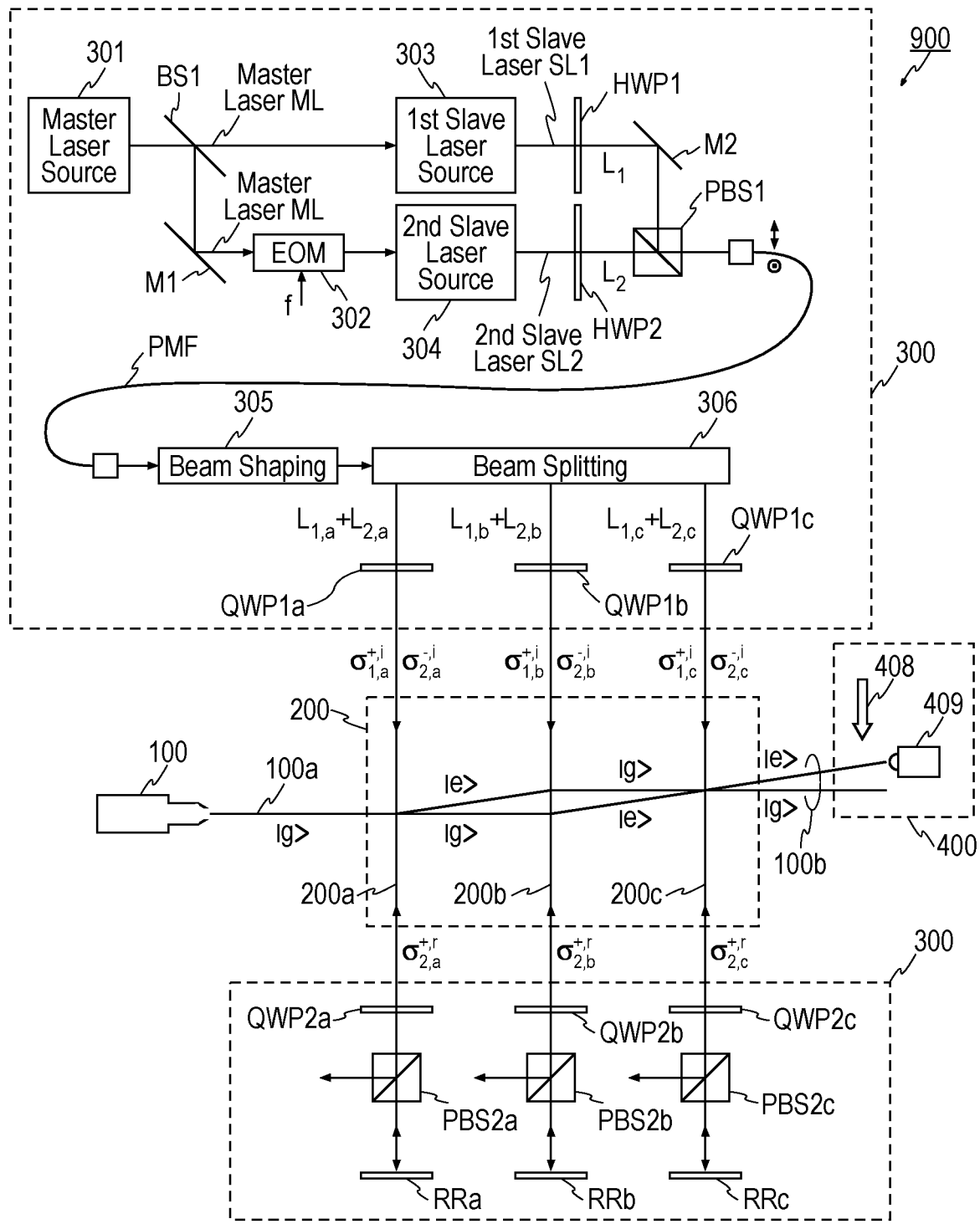
FIG. 1 is a diagram for explaining the configuration of a prior-art Mach-Zehnder atomic interferometer.
Figure 2:
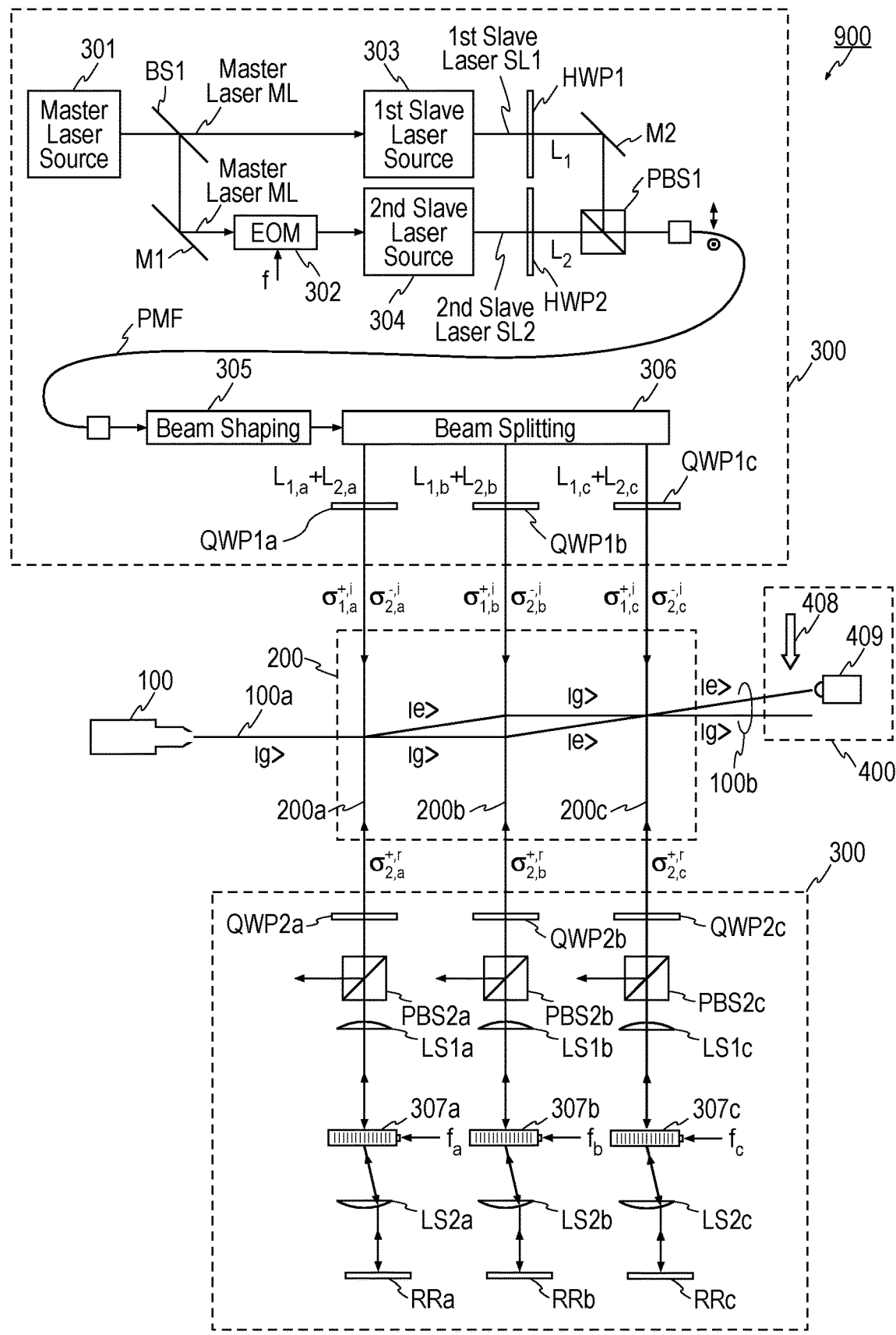
FIG. 2 is a diagram for explaining the configuration of a prior-art Mach-Zehnder atomic interferometer.

A description of an embodiment of the present invention is given in connection with, for instance, a Mach-Zehnder atomic interference scheme. It is to be noted that the drawings are provided for the understanding of the embodiment and the size of each component illustrated therein is different from the actual size. For the sake of convenience, a description of the embodiment is based on a Mach-Zehnder atomic interferometer; it is to be noted that the gist of the present invention can be applied to any atomic interference scheme using a moving standing light wave.

A Mach-Zehnder atomic interferometer 500 of the embodiment includes "an optical modulating device that adopts an optical configuration including an AOM and guiding a laser beam by an optical fiber" in place of the above-mentioned "retroreflection optical configuration to which an AOM is added".

An optical system 300 included in the Mach-Zehnder atomic interferometer 500 of the embodiment includes three optical modulating devices 510a, 510b, and 510c corresponding to three moving standing light waves 200a, 200b, and 200c. The optical modulating device 510x (x∈{a, b, c}) includes optical fibers 511x and 514x in which a laser beam propagates and a frequency shifter 513x that is connected to the optical fibers 511x and 514x and shifts the frequency of the laser beam. Any frequency shifter can be used as the frequency shifter 513x; for example, the frequency shifter 513x is an AOM or EOM.

Figure 3:
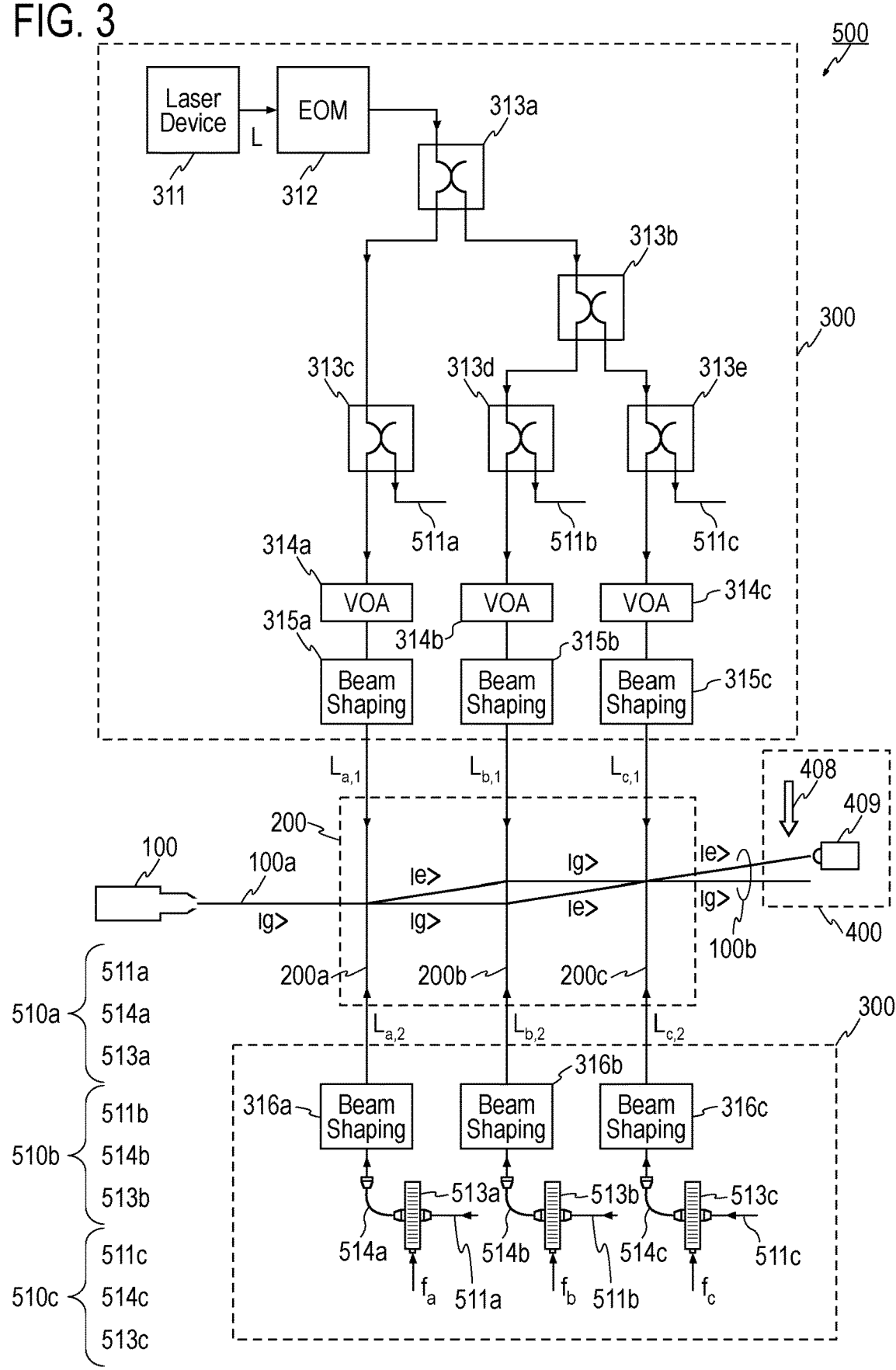
FIG. 3 is a diagram for explaining the configuration of a Mach-Zehnder atomic interferometer of an embodiment (a first example).
Figure 4:
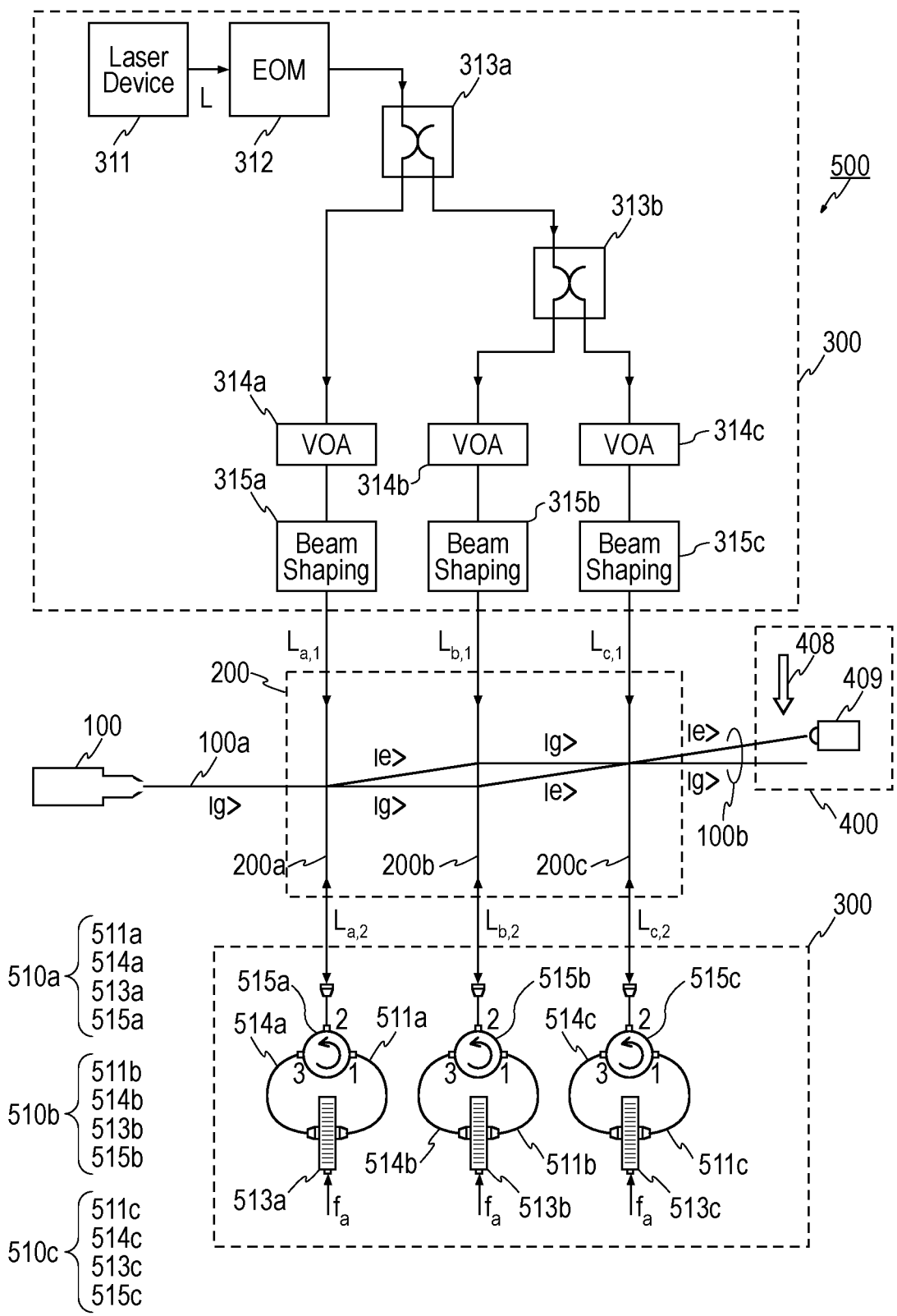
FIG. 4 is a diagram for explaining the configuration of a Mach-Zehnder atomic interferometer of the embodiment (a second example).
Figure 5:
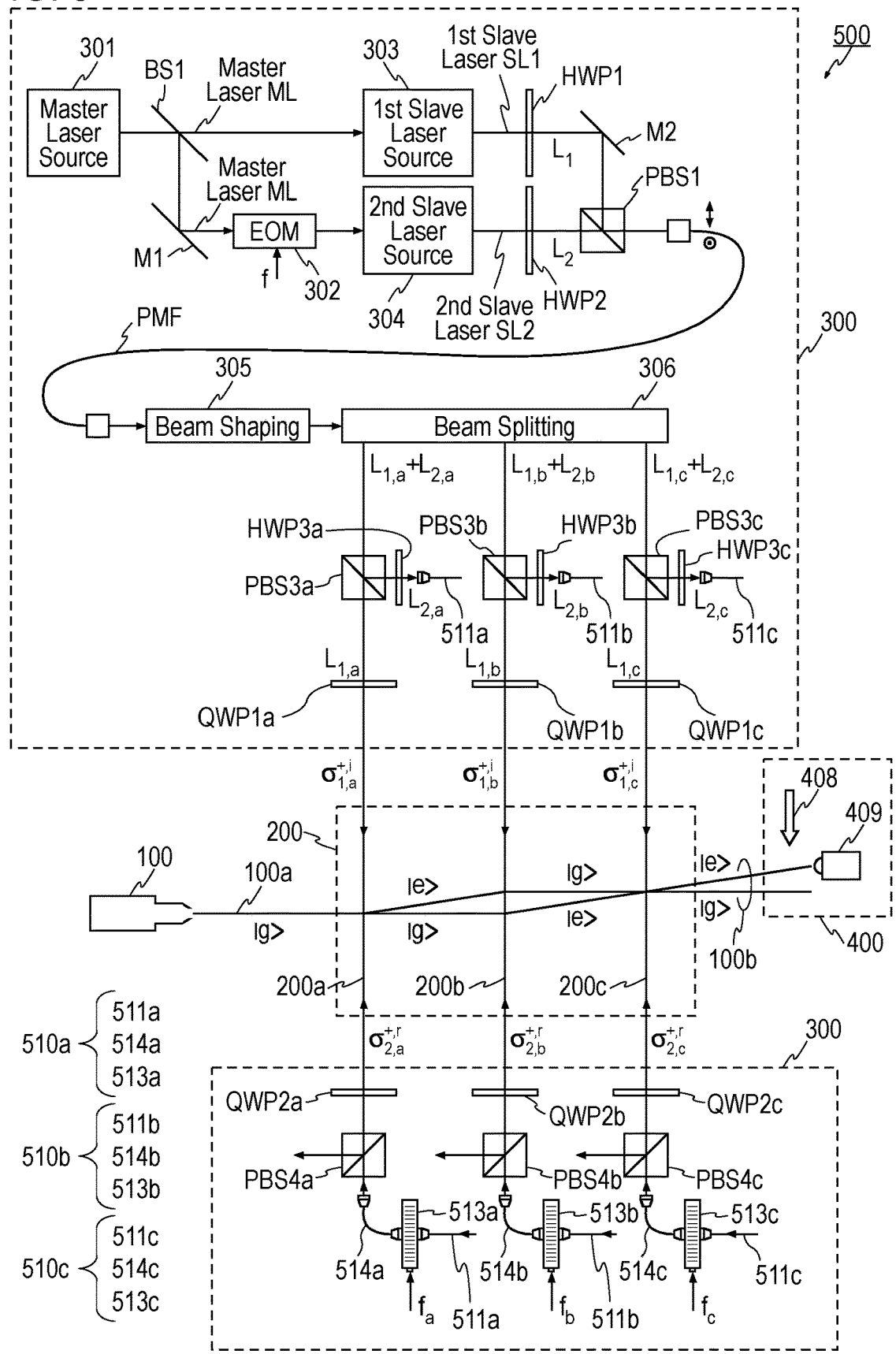
FIG. 5 is a diagram for explaining the configuration of a Mach-Zehnder atomic interferometer of the embodiment (a third example).
Figure 6:
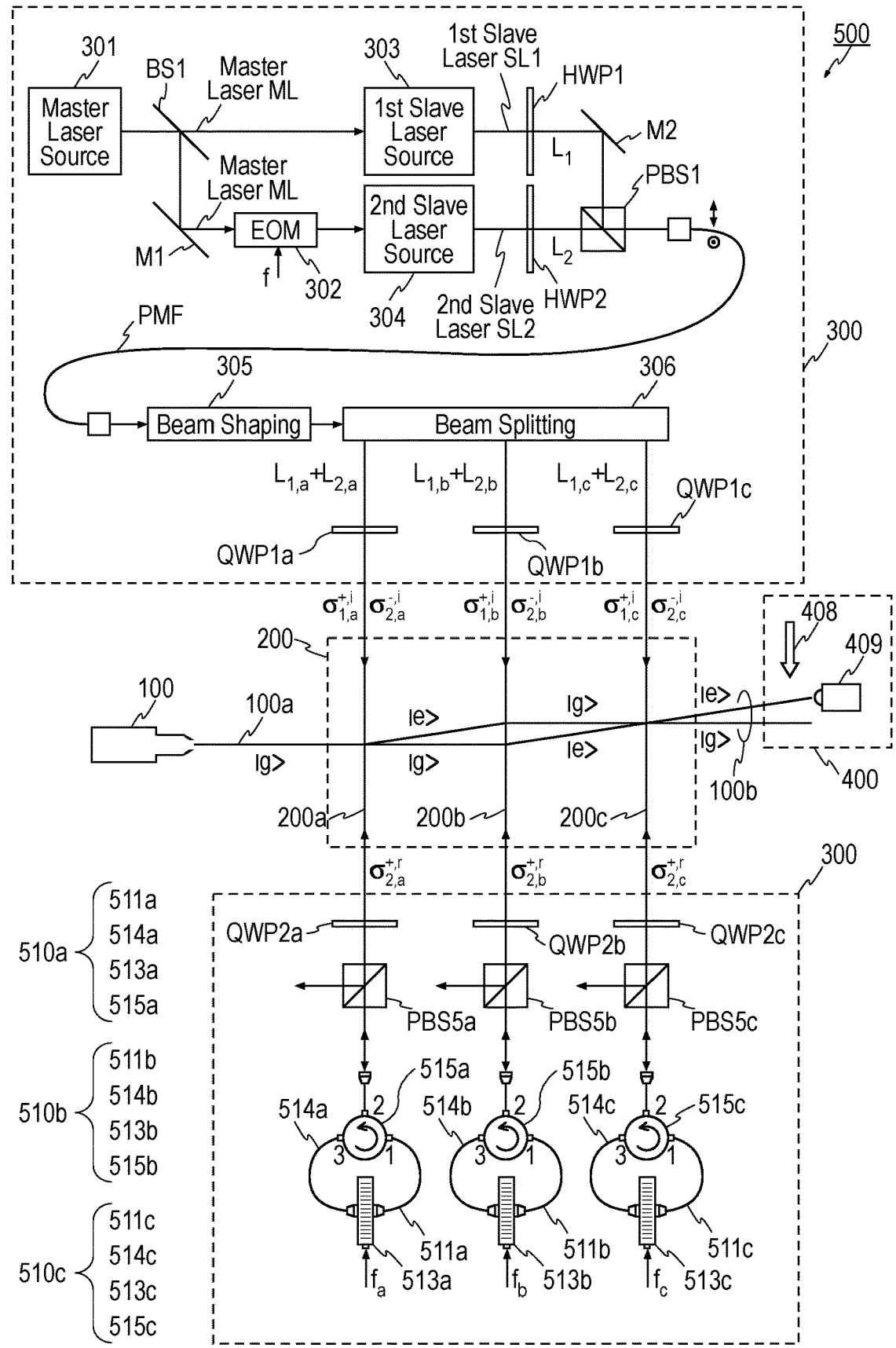
FIG. 6 is a diagram for explaining the configuration of a Mach-Zehnder atomic interferometer of the embodiment (a fourth example).

Hereinafter, descriptions are given of a first example (see FIG. 3), a second example (see FIG. 4), a third example (see FIG. 5), and a fourth example (see FIG. 6) of the Mach-Zehnder atomic interferometer 500 using the optical modulating device 510x.

First Example

A laser beam L (for example, a laser beam which is circularly polarized light) from a laser source 311 is frequency-shifted by a predetermined frequency by passing through an EOM 312. The frequency-shifted laser beam L is equally divided by an optical fiber coupler 313a. One of the two laser beams L coming out of the optical fiber coupler 313a is equally divided by an optical fiber coupler 313c, and the other of the two laser beams L coming out of the optical fiber coupler 313a is equally divided by an optical fiber coupler 313b. One of the two laser beams L coming out of the optical fiber coupler 313b is equally divided by an optical fiber coupler 313d, and the other of the two laser beams L coming out of the optical fiber coupler 313b is equally divided by an optical fiber coupler 313e.

One of the two laser beams L coming out of the optical fiber coupler 313c is attenuated by a variable optical attenuator (VOA) 314a and then subjected to shaping so as to be a desired beam $L_{a,1}$ (for example, a Gaussian beam $\sigma_a^+$ which is circularly polarized light) by a beam shaper 315a built up of, for example, a lens, a collimator, and so forth. The obtained beam $L_{a,1}$ enters an interference system 200. The other of the two laser beams L coming out of the optical fiber coupler 313c is guided to an AOM 513a, without crossing an atomic beam, by an optical fiber 511a with one end thereof connected to the optical fiber coupler 313c by an unillustrated optical connector. An intermediate part of the optical fiber 511a is not shown in FIG. 3 to make the drawing easily visible.

One of the two laser beams L coming out of the optical fiber coupler 313d is attenuated by a VOA 314b and then subjected to shaping so as to be a desired beam $L_{b,1}$ (for example, a Gaussian beam $\sigma_b^+$ which is circularly polarized light) by a beam shaper 315b built up of, for example, a lens, a collimator, and so forth. The obtained beam $L_{b,1}$ enters the interference system 200. The other of the two laser beams L coming out of the optical fiber coupler 313d is guided to an AOM 513b, without crossing an atomic beam, by an optical fiber 511b with one end thereof connected to the optical fiber coupler 313d by an unillustrated optical connector. An intermediate part of the optical fiber 511b is not shown in FIG. 3 to make the drawing easily visible.

One of the two laser beams L coming out of the optical fiber coupler 313e is attenuated by a VOA 314c and then subjected to shaping so as to be a desired beam $L_{c,1}$ (for example, a Gaussian beam $\sigma_c^+$ which is circularly polarized light) by a beam shaper 315c built up of, for example, a lens, a collimator, and so forth. The obtained beam $L_{c,1}$ enters the interference system 200. The other of the two laser beams L coming out of the optical fiber coupler 313e is guided to an AOM 513c, without crossing an atomic beam, by an optical fiber 511c with one end thereof connected to the optical fiber coupler 313e by an unillustrated optical connector. An intermediate part of the optical fiber 511c is not shown in FIG. 3 to make the drawing easily visible.

The other end of the optical fiber 511x (x∈{a, b, c}) is connected to the frequency shifter 513x by an optical connector, thus the laser beam L enters the frequency shifter 513x. The frequency of the laser beam L is shifted by the frequency shifter 513x. The amount of shift is determined by the frequency $f_x$ of a signal input to the frequency shifter 513x. As a result, the laser beam L is phase-modulated. One end of the optical fiber 514x is connected to the frequency shifter 513x by an optical connector, thus the laser beam L coming out of the frequency shifter 513x enters the optical fiber 514x. The laser beam L comes out of an optical connector attached to the other end of the optical fiber 514x and is subjected to shaping so as to be a desired beam $L_{x,2}$ (for example, a Gaussian beam $\sigma_x^+$ which is circularly polarized light) by a beam shaper 316x built up of, for example, a lens, a collimator, and so forth. The obtained beam $L_{x,2}$ enters the interference system 200.

As a result, the laser beam $L_{x,1}$ that has not passed through the optical modulating device 510x and the laser beam $L_{x,2}$ that has passed through the optical modulating device 510x counter-propagate in free space to generate a moving standing light wave 200x (x∈{a, b, c}).

Second Example

The second example is a modification of the first example. A laser beam L (for example, a laser beam which is circularly polarized light) from a laser source 311 is frequency-shifted by a predetermined frequency by passing through an EOM 312. The frequency-shifted laser beam L is equally divided by an optical fiber coupler 313a. One of the two laser beams L coming out of the optical fiber coupler 313a is attenuated by a VOA 314a and then subjected to shaping so as to be a desired beam $L_{a,1}$ (for example, a Gaussian beam $\sigma_a^+$ which is circularly polarized light) by a beam shaper 315a built up of, for example, a lens, a collimator, and so forth. The obtained beam $L_{a,1}$ enters an interference system 200.

The other of the two laser beams L coming out of the optical fiber coupler 313a is equally divided by an optical fiber coupler 313b. One of the two laser beams L coming out of the optical fiber coupler 313b is attenuated by a VOA 314b and then subjected to shaping so as to be a desired beam $L_{b,1}$ (for example, a Gaussian beam $\sigma_b^+$ which is circularly polarized light) by a beam shaper 315b built up of, for example, a lens, a collimator, and so forth. The obtained beam $L_{b,1}$ enters the interference system 200. The other of the two laser beams L coming out of the optical fiber coupler 313b is attenuated by a VOA 314c and then subjected to shaping so as to be a desired beam $L_{c,1}$ (for example, a Gaussian beam $\sigma_c^+$ which is circularly polarized light) by a beam shaper 315c built up of, for example, a lens, a collimator, and so forth. The obtained beam $L_{c,1}$ enters the interference system 200.

The optical modulating device 510x (x∈{a, b, c}) in the second example includes a three-port optical circulator 515x in addition to the components of the optical modulating device 510x in the first example. In the three-port optical circulator $515x$, the light that has entered a port 1 comes out of a port 2 and the light that has entered the port 2 comes out of a port 3. One end of the frequency shifter $513x$ is connected to one end of the optical fiber $511x$, the other end of the optical fiber $511x$ is connected to a first port of the optical circulator $515x$, the other end of the frequency shifter $513x$ is connected to one end of the optical fiber $514x$, and the other end of the optical fiber $514x$ is connected to a third port of the optical circulator $515x$. The optical fibers $511x$ and $514x$ are each connected to the frequency shifter $513x$ by an optical connector.

The beam $L_{x,1}$ obtained by the beam shaper $315x$ is introduced into a second port of the optical circulator $515x$ by an optical connector attached to the second port of the optical circulator $515x$. This optical connector is an optical connector having a lens collimator, for example. The beam $L_{x,1}$ is transmitted from the second port to the third port, travels along the optical fiber $514x$ connected to the third port and then enters the frequency shifter $513x$. The frequency of the beam $L_{x,1}$ is shifted by the frequency shifter $513x$. The amount of shift is determined by the frequency $f_x$ of a signal input to the frequency shifter $513x$. As a result, the beam $L_{x,1}$ is phase-modulated. The beam $L_{x,1}$ coming out of the frequency shifter $513x$ is introduced into the first port of the optical circulator $515x$ via the optical fiber $511x$ connected to the frequency shifter $513x$. The phase-modulated beam $L_{x,1}$ is transmitted from the first port to the second port and comes out of the optical connector as a beam $L_{x,2}$. As a result, the laser beam $L_{x,1}$ that has not passed through the optical modulating device $510x$ and the laser beam $L_{x,2}$ that has passed through the optical modulating device $510x$ counter-propagate in free space to generate a moving standing light wave $200x$ ($x \in \{a, b, c\}$).

A four-port optical circulator may be used in place of the three-port optical circulator $515x$. In this case, a fourth port is not used. In the four-port optical circulator $515x$, the light that has entered a port 1 comes out of a port 2, the light that has entered the port 2 comes out of a port 3, and the light that has entered the port 3 comes out of a port 4.

Third Example

A Mach-Zehnder atomic interferometer $500$ of the third example is the same as the Mach-Zehnder atomic interferometer $900$ except that the Mach-Zehnder atomic interferometer $500$ includes "an optical modulating device that adopts an optical configuration including an AOM and guiding a laser beam by an optical fiber" in place of the above-mentioned "retroreflection optical configuration to which an AOM is added". Therefore, the following description deals with a difference between the Mach-Zehnder atomic interferometer $500$ and the Mach-Zehnder atomic interferometer $900$, that is, the optical modulating device. Repetitive descriptions of the common matter of the Mach-Zehnder atomic interferometer $500$ and the Mach-Zehnder atomic interferometer $900$ are omitted by incorporating the description of the above-mentioned Mach-Zehnder atomic interferometer $900$ into the description of the third example.

The laser beam $L_{1,x}$ and the laser beam $L_{2,x}$ ($x \in \{a, b, c\}$) obtained by the beam divider $306$ in the manner described above enter a polarizing beam splitter PBS$3x$. The laser beam $L_{1,x}$ which is linearly polarized light passes through the polarizing beam splitter PBS$3x$, and the laser beam $L_{2,x}$ which is linearly polarized light is reflected from the polarizing beam splitter PBS$3x$ at an angle of 90°. The laser beam $L_{1,x}$ passes through a ¼ wave plate QWP$1x$ and becomes right-handed circularly polarized light $\sigma_{1,x}^{+,i}$. The right-handed circularly polarized light $\sigma_{1,x}^{+,i}$ passes through a ¼ wave plate QWP$2x$ and enters a polarizing beam splitter PBS$4x$. The linearly polarized light corresponding to the right-handed circularly polarized light $\sigma_{1,x}^{+,i}$ is reflected from the polarizing beam splitter PBS$4x$ at an angle of 90° and enters an unillustrated optical isolator.

The laser beam $L_{2,x}$ reflected from the polarizing beam splitter PBS$3x$ passes through a ½ wave plate HWP$3x$ and is introduced into the optical fiber $511x$, without crossing an atomic beam, by an optical connector attached to one end of the optical fiber $511x$. An intermediate part of the optical fiber $511x$ is not shown in FIG. 5 to make the drawing easily visible. This optical connector is an optical connector having a lens collimator, for example. The other end of the optical fiber $511x$ is connected to the frequency shifter $513x$, thus the laser beam $L_{2,x}$ enters the frequency shifter $513x$. The frequency of the laser beam $L_{2,x}$ is shifted by the frequency shifter $513x$. The amount of shift is determined by the frequency $f_x$ of a signal input to the frequency shifter $513x$. As a result, the laser beam $L_{2,x}$ is phase-modulated. One end of the optical fiber $514x$ is connected to the frequency shifter $513x$, thus the laser beam $L_{2,x}$ coming out of the frequency shifter $513x$ enters the optical fiber $514x$. The optical fibers $511x$ and $514x$ are each connected to the frequency shifter $513x$ by an optical connector. The laser beam $L_{2,x}$ comes out of an optical connector attached to the other end of the optical fiber $514x$, passes through the polarizing beam splitter PBS$4x$, then passes through the ¼ wave plate QWP$2x$, and becomes right-handed circularly polarized light $\sigma_{2,x}^{+,r}$. As a result, the right-handed circularly polarized light $\sigma_{1,x}^{+,i}$, which is derived from the laser beam that is from the polarization-maintaining fiber PMF, and the right-handed circularly polarized light $\sigma_{2,x}^{+,r}$, which is derived from the laser beam that is from the optical modulating device $510x$, counter-propagate in free space to generate a moving standing light wave $200x$ ($x \in \{a, b, c\}$).

Fourth Example

The fourth example is a modification of the third example. The optical modulating device $510x$ in the fourth example includes a three-port optical circulator $515x$ in addition to the components of the optical modulating device $510x$ in the third example. One end of the frequency shifter $513x$ is connected to one end of the optical fiber $511x$, the other end of the optical fiber $511x$ is connected to a first port of the optical circulator $515x$, the other end of the frequency shifter $513x$ is connected to one end of the optical fiber $514x$, and the other end of the optical fiber $514x$ is connected to a third port of the optical circulator $515x$. The optical fibers $511x$ and $514x$ are each connected to the frequency shifter $513x$ by an optical connector.

The laser beam $L_{1,x}$ and the laser beam $L_{2,x}$ ($x \in \{a, b, c\}$) obtained by the beam divider $306$ pass through a ¼ wave plate QWP$1x$ and become right-handed circularly polarized light $\sigma_{1,x}^{+,i}$ and left-handed circularly polarized light $\sigma_{2,x}^{-,i}$. The right-handed circularly polarized light $\sigma_{1,x}^{+,i}$ and the left-handed circularly polarized light $\sigma_{2,x}^{-,i}$ then pass through a ¼ wave plate QWP$2x$ and enter a polarizing beam splitter PBS$5x$. The linearly polarized light corresponding to the right-handed circularly polarized light $\sigma_{1,x}^{+,i}$ is reflected from the polarizing beam splitter PBS$5x$ at an angle of 90° and enters an unillustrated optical isolator. The linearly polarized light corresponding to the left-handed circularly polarized light $\sigma_{2,x}^{-,i}$ passes through the polarizing beam splitter PBS$5x$ and is introduced into a second port of the optical circulator $515x$ by an optical connector attached to the second port of the optical circulator $515x$. This optical connector is an optical connector having a lens collimator, for example. This linearly polarized light is transmitted from the second port to the third port, travels along the optical fiber $514x$ connected to the third port and then enters the frequency shifter $513x$. The frequency of the linearly polarized light is shifted by the frequency shifter $513x$. The amount of shift is determined by the frequency $f_x$ of a signal input to the frequency shifter $513x$. As a result, the linearly polarized light is phase-modulated. The linearly polarized light coming out of the frequency shifter $513x$ is introduced into the first port of the optical circulator $515x$ via the optical fiber $511x$ connected to the frequency shifter $513x$. The phase-modulated linearly polarized light is transmitted from the first port to the second port and comes out of the optical connector. The linearly polarized light derived from the laser beam $L_{2,x}$ passes through the polarizing beam splitter PBS$5x$, then passes through the ¼ wave plate QWP$2x$, and becomes right-handed circularly polarized light $\sigma_{2,x}^{+,r}$. As a result, the right-handed circularly polarized light $\sigma_{1,x}^{+,i}$, which is derived from the laser beam that is from the polarization-maintaining fiber PMF, and the right-handed circularly polarized light $\sigma_{2,x}^{+,r}$, which is derived from the laser beam that is from the optical modulating device $510x$, counter-propagate in free space to generate a moving standing light wave $200x$ ($x \in \{a, b, c\}$).

An four-port optical circulator may be used in place of the three-port optical circulator $515x$. In this case, a fourth port is not used.

As is clear from the embodiment described above, unlike the retroreflection optical configuration that removes diffracted light of any unnecessary order in the space between the AOM $307x$ and the retroreflector RR$x$, the optical configuration that guides a laser beam by an optical fiber can eliminate diffracted light of any unnecessary order by selection or separation of a propagation mode of an optical fiber. Furthermore, the optical configuration that guides a laser beam by an optical fiber is not subject to design constraints derived from the focal distance of the lens LS$2x$. In addition, since a core diameter of an optical fiber—for example, a mode field diameter of a single-mode optical fiber is typically about 0.005 mm—is sufficiently smaller than a beam diameter of a laser beam incident on the AOM $307x$—the beam diameter is sufficiently greater than an acoustic wave in a crystal and is typically about 0.5 mm—, it is possible to make the focal distance between an optical fiber and a lens for introducing the laser beam propagated in free space into the optical fiber shorter than the distance between the lens LS$1x$ and the AOM $307x$. Thus, the optical configuration that guides a laser beam by an optical fiber contributes to implementation of a compact atomic gyroscope and a compact atomic interferometer.

There is a possibility that the retroreflection optical configuration is affected by the influence of an air current or vibration of a retroreflector or other influences, so that a mechanism for eliminating these influences is needed. According to the present embodiment, the optical modulating device $510x$ ($x \in \{a, b, c\}$) is not affected by the influence of vibration of a retroreflector because the optical modulating device $510x$ ($x \in \{a, b, c\}$) does not include a retroreflector. Since the optical modulating device $510x$ includes the optical fibers $511x$ and $514x$, it would be an overstatement to say that there is no possibility that the optical fibers $511x$ and $514x$ are affected by the influence of an air current; however, some techniques are already known to cancel errors occurred by vibration of the optical fibers $511x$ and $514x$ due to an air current or the like (see Reference Literature 1). For that matter, the securing of the optical fibers $511x$ and $514x$ with, for instance, fastenings helps to reduce the possibility that the optical fibers $511x$ and $514x$ are affected by the influence of an air current.

(Reference Literature 1) Longsheng Ma, et al., "Delivering the same optical frequency at two places: accurate cancellation of phase noise introduced by an optical fiber or other time-varying path," Optics letters (1994), Vol. 19, No. 21, 1777-1779.

When the Mach-Zehnder atomic interferometer $500$ is used as an atomic gyroscope, the monitor $400$ may detect angular velocity or acceleration on the basis of the population of atoms in an excited state. The detecting of angular velocity or acceleration on the basis of the population of atoms in an excited state is a well-known technique and therefore descriptions thereof are omitted.

The embodiment described above adopts the Mach-Zehnder atomic interference scheme; a Ramsey-Borde atomic interference scheme, for example, may be adopted instead.

A moving standing light wave $200x$ ($x \in \{a, b, c\}$) may be obtained from left-handed circularly polarized light $\sigma_{1,x}^{-,i}$, which is derived from a laser beam that is from a polarization-maintaining fiber, and left-handed circularly polarized light $\sigma_{2,x}^{-,r}$, which is derived from a laser beam that is from the optical modulating device $510x$ ($x \in \{a, b, c\}$).

Furthermore, the embodiment described above refers to, as an example, Mach-Zehnder atomic interference in which one splitting, one reversal, and one mixing are performed using three moving standing light waves; the present invention is not limited to such an embodiment and can be carried out as, for example, an embodiment using multistage Mach-Zehnder atomic interference in which more than one splitting, more than one reversal, and more than one mixing are performed. See Reference Literature 2 about such multistage Mach-Zehnder atomic interference.

(Reference Literature 2) Takatoshi Aoki et al., "High-finesse atomic multiple-beam interferometer comprised of copropagating stimulated Raman-pulse fields," Phys. Rev. A 63, 063611 (2001)—Published 16 May 2001.

In the claims and the specification, unless otherwise noted, the term "connected" and every inflected form thereof do not necessarily deny that one or more intermediate elements are present between two elements "connected" to each other.

In the claims and the specification, unless otherwise noted, an ordinal numeral is not intended to limit an element modified by or coupled to the ordinal numeral by an ordinal position or the amount of the element. Unless otherwise noted, an ordinal numeral is merely used as a convenient expression method to distinguish two or more elements from one another. Thus, for example, the phrase "a first X" and the phrase "a second X" are expressions to distinguish between two Xs and do not necessarily mean that the total number of Xs is 2 or do not necessarily mean that the first X has to come before the second X. The term "first" does not necessarily mean "coming before all others in order".

In the claims and the specification, the term "include" and inflected forms thereof are used as non-exclusive expressions. For example, the sentence "X includes A and B" does not deny that X includes a component other than A and B, for example, C. Moreover, when a certain sentence includes a phrase in which the term "include" or an inflected form thereof is coupled to a negative word, for example, "not include", the sentence only makes mention of the object of the phrase. Thus, for example, the sentence "X does not include A and B" acknowledges a possibility that X includes a component other than A and B. In addition, the term "or" is not intended to mean an exclusive OR.

The foregoing description of the embodiment of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

DESCRIPTION OF REFERENCE NUMERALS 100 atomic beam source
100a atomic beam
100b atomic beam
200 interference system
200a first moving standing light wave
200b second moving standing light wave
200c third moving standing light wave
300 optical system
301 master laser source
302 EOM
303 first slave laser source
304 second slave laser source
305 beam shaper
306 beam divider
307a AOM
307b AOM
307c AOM
311 laser source
312 EOM
313a optical fiber coupler
313b optical fiber coupler
313c optical fiber coupler
313d optical fiber coupler
313e optical fiber coupler
314a VOA
314b VOA
314c VOA
315a beam shaper
315b beam shaper
315c beam shaper
316a beam shaper
316b beam shaper
316c beam shaper
400 monitor
408 probe beam
409 photodetector
500 Mach-Zehnder atomic interferometer
510a optical modulating device
510b optical modulating device
510c optical modulating device
511a optical fiber
511b optical fiber
511c optical fiber
513a frequency shifter
513b frequency shifter
513c frequency shifter
514a optical fiber
514b optical fiber
514c optical fiber
515a optical circulator
515b optical circulator
515c optical circulator
900 Mach-Zehnder atomic interferometer
BS1 beam splitter
HWP1 ½ wave plate
HWP2 ½ wave plate
HWP3a ½ wave plate
HWP3b ½ wave plate
HWP3c ½ wave plate
LS1a lens
LS1b lens
LS1c lens
LS2a lens
LS2b lens
LS2c lens
M1 mirror
M2 mirror
ML master laser beam
PBS1 polarizing beam splitter
PBS2a polarizing beam splitter
PBS2b polarizing beam splitter
PBS2c polarizing beam splitter
PBS3a polarizing beam splitter
PBS3b polarizing beam splitter
PBS3c polarizing beam splitter
PBS4a polarizing beam splitter
PBS4b polarizing beam splitter
PBS4c polarizing beam splitter
PBS5a polarizing beam splitter
PBS5b polarizing beam splitter
PBS5c polarizing beam splitter
PMF polarization-maintaining fiber
QWP1a ¼ wave plate
QWP1b ¼ wave plate
QWP1c ¼ wave plate
QWP2a ¼ wave plate
QWP2b ¼ wave plate
QWP2c ¼ wave plate
RRa retroreflector
RRb retroreflector
RRc retroreflector
SL1 first slave laser beam
SL2 second slave laser beam

What is claimed is:

1. An atomic gyroscope comprising:
an interference system configured to make an atomic beam interact with three or more moving standing light waves;
an optical system including an optical modulating device and being configured to generate at least one of the three or more moving standing light waves by counter-propagation of a first laser beam from the optical modulating device and a second laser beam; and
a monitor configured to detect angular velocity or acceleration by monitoring the atomic beam from the interference system,
wherein the optical modulating device includes:
a frequency shifter; and
an optical fiber to guide one of two laser beams generated by division of a single laser beam to an opposite side of an incident position onto the interference system of the other of the two laser beams, beyond the interference system without crossing the atomic beam, the one of the two laser beams is frequency-shifted by the frequency shifter, the one of the two laser beams that is frequency-shifted enters the interference system as the first laser beam, and the other of the two laser beams enters the interference system as the second laser beam.

2. The atomic gyroscope according to claim 1, wherein the frequency shifter is an acousto-optic modulator or an electro-optic modulator.

3. An atomic gyroscope comprising:

an interference system configured to make an atomic beam interact with three or more moving standing light waves;

an optical system including an optical modulating device and being configured to generate at least one of the three or more moving standing light waves by counter-propagation of a first laser beam from the optical modulating device and a second laser beam; and a monitor configured to detect angular velocity or acceleration by monitoring the atomic beam from the interference system, wherein the optical modulating device includes:

an optical circulator having a first port, a second port, and a third port;

a frequency shifter;

a first optical fiber having one end connected to the first port of the optical circulator and another end connected to the frequency shifter; and a second optical fiber having one end connected to the third port of the optical circulator and another end connected to the frequency shifter, the second laser beam passes through the interference system and enters the second port of the optical circulator to propagate the second optical fiber toward the frequency shifter, the frequency shifter frequency-shifts the second laser beam to output the first laser beam, and the first laser beam propagates the first optical fiber toward the optical circulator to come out of the second port of the optical circulator and enters the interference system.

4. The atomic gyroscope according to claim 3, wherein the frequency shifter is an acousto-optic modulator or an electro-optic modulator.

5. An atomic interferometer comprising:

an interference system configured to make an atomic beam interact with three or more moving standing light waves; and an optical system including an optical modulating device and being configured to generate at least one of the three or more moving standing light waves by counter-propagation of a first laser beam from the optical modulating device and a second laser beam, wherein the optical modulating device includes:

a frequency shifter; and an optical fiber to guide one of two laser beams generated by division of a single laser beam to an opposite side of an incident position onto the interference system of the other of the two laser beams, beyond the interference system without crossing the atomic beam, the one of the two laser beams is frequency-shifted by the frequency shifter, the one of the two laser beams that is frequency-shifted enters the interference system as the first laser beam, and the other of the two laser beams enters the interference system as the second laser beam.

6. An atomic interferometer comprising:

an interference system configured to make an atomic beam interact with three or more moving standing light waves; and an optical system including an optical modulating device and being configured to generate at least one of the three or more moving standing light waves by counter-propagation of a first laser beam from the optical modulating device and a second laser beam, wherein the optical modulating device includes:

an optical circulator having a first port, a second port, and a third port;

a frequency shifter;

a first optical fiber having one end connected to the first port of the optical circulator and another end connected to the frequency shifter; and a second optical fiber having one end connected to the third port of the optical circulator and another end connected to the frequency shifter, the second laser beam passes through the interference system and enters the second port of the optical circulator to propagate the second optical fiber toward the frequency shifter, the frequency shifter frequency-shifts the second laser beam to output the first laser beam, and the first laser beam propagates the first optical fiber toward the optical circulator to come out of the second port of the optical circulator and enters the interference system.

* * * * *